May 6, 1958    D. N. BEEBE    2,833,250
SELF-RETRACTING DOG LEASH ASSEMBLY
Filed Sept. 24, 1956

INVENTOR.
DOUGLAS N. BEEBE
BY
Knox & Knox

United States Patent Office 2,833,250
Patented May 6, 1958

2,833,250

SELF-RETRACTING DOG LEASH ASSEMBLY

Douglas N. Beebe, San Diego, Calif.

Application September 24, 1956, Serial No. 611,714

6 Claims. (Cl. 119—109)

This invention relates generally to leashes for animals and more particularly to a leash assembly wherein the leash per se is retractable into a relatively small casing and the casing is carried by the leashed animal.

A primary object of the invention is to provide a leash assembly wherein the collar, ordinarily a dog collar, comprises at least the principal portion of means to prevent the casing from rotating as the leash is withdrawn. This function of preventing the casing from rotating is ordinarily, in prior art devices, accomplished by the hand of the person holding the leash. In such prior art devices, the casing is ordinarily carried by the trainer or dog owner, rather than by the animal, and there is no real combination as between the casing and the collar attached to the animal. In the present invention, there is a real cooperation or combination of functionalities or instrumentalities, since the dog collar directly or indirectly holds the casing against rotation as the leash is withdrawn, it being remembered that the leash in this device is of the spirally wound retractable type.

Another object of this invention, ancillary to the preceding object, is to provide a leash assembly which is extremely convenient to use, since the casing and leash are at all times carried by the animal, in readily accessible position.

Another object of this invention is to provide a retractable leash, carried by the animal, wherein the hand hold on the leash is almost entirely withdrawn into the casing, this withdrawal being accomplished automatically when the leash is released. This prevents the hand hold or any other portion of the device from being likely to be caught in bushes or other portions of the dog's environment.

Still another object of this invention is to provide a leash assembly wherein all the advantages of an automatically retracting leash are preserved, including the prevention of a slack leash allowing the dog to straddle or step over the leash.

A specific object of this invention is to provide special means for securement of the dog collar to the casing of the leash assembly and to arrange the elements concerned so that the strain on certain portions of the casing is minimized, thus allowing the utilization of light weight casing construction.

Finally, it is an object of this invention to provide a leash assembly of the aforementioned general character which is simple, safe and convenient to use and which will give generally efficient and durable service.

With these objects definitely in view, along with other objects which will appear hereinafter as this description proceeds, this invention consists in the novel construction, combination and arrangement of elements and portions, as will be hereinafter fully described in the specification, particularly pointed out in the claims, and illustrated in the drawing which forms a material part of this disclosure and in which:

Figure 3:
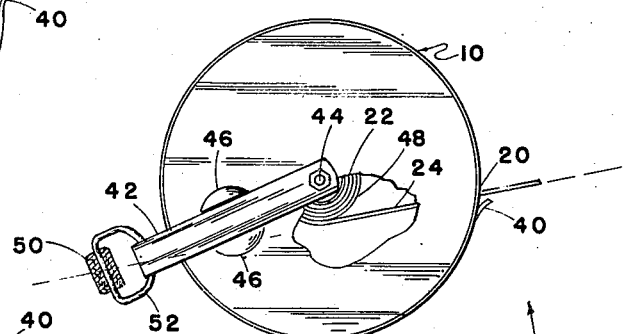
Figure 4:
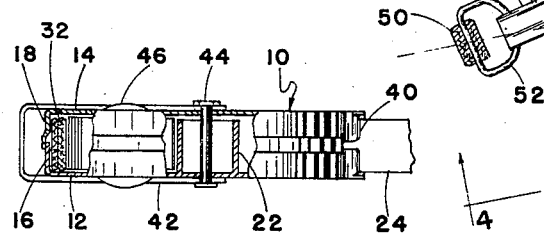

Figure 3 is an enlarged side elevational view of the casing partially broken away to show underlying portions and showing the leash and collar fragmentarily, the figure being proposed as illustrating how the yoke is held by deformations in the casing in a position with the point of connection of the collar being co-linear with opening in the casing and with a point on the tightly wound hub portion of the leash when the same is fully extended, this arrangement permitting light construction of the casing inasmuch as the strain on the deformations holding the yoke in place is minimized; and Figure 4 is an enlarged edge elevational view, taken substantially from the viewpoint indicated at 4—4 in Figure 3, portions being broken away and the underlying portions being shown in section, and the collar and connecting link being deleted from this figure.

Similar characters of reference indicate similar or identical elements and portions throughout the specification and through the different views in the drawing.

Referring now to the drawing in detail, this leash assembly includes a casing generally indicated by the numeral 10 and consisting in a main shell portion 12 and a cap portion 14. These portions of the casing have overlapping wall portions 16 and 18 which will ordinarily be permanently secured together during the fabrication of the device by welding or other suitable means. As illustrated, the casing is generally cylindrical and, of course, hollow, and an opening 20 is provided at one side of the casing in the wall portions 16 and 18.

Figure 1:
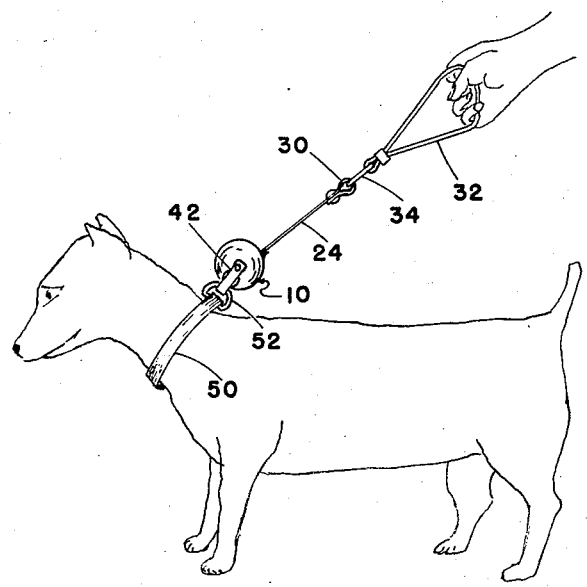
Figure 1 is a side elevational view of this invention secured on the neck of an animal and with the hand hold of the leash held by a hand, the leash being only partially extended.
Figure 2:
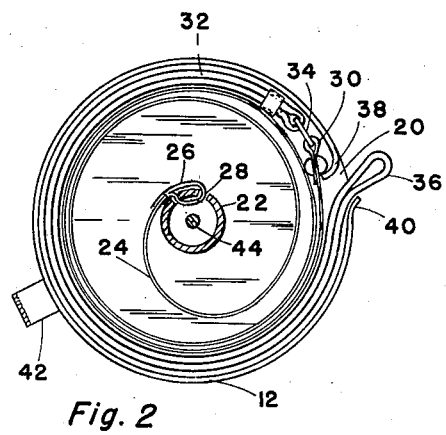
Figure 2 is an enlarged elevational view of the casing and leash and parts immediately connected therewith, the cap portion of the casing being removed and the yoke being partially removed.

A spool 22 is provided near the center of the casing, this spool being unitary as illustrated with the main shell portion 12 of the casing or otherwise rigidly secured to the casing, and a spring leash 24 of resilient coiled tape form has its inner end 26 permanently secured to this spool 22 which is slotted, as indicated at 28, to permit securement of this inner end thereto. In this connection, it will of course be obvious that the exact nature of the spool 22 and the exact means of securing the inner end 26 of the spring leash thereto are actually technilogical details and considerable variation may be resorted to within the scope of this invention. It is also important to note that, in the preferred form of this invention, the inner end of the leash will always, however, be secured relative to the casing. The spring leash is similar in form to a clock spring and assumes a relatively loosely coiled form in its relaxed or retracted condition as seen in Fig. 2. However, when the leash is extended out of the casing by the pull of the animal that portion adjacent the inner end 26 is tightly wound on the spool 22 as seen in Fig. 3. Upon the removal of pull on the leash the spring will uncoil itself and retract its extended portion and the attached leash into the casing, again assuming the loosely coiled condition of Fig. 2. In other words, there is no separate spring required, since the leash in this invention is resilient and is self-retracting without the employment of any other media.

The opening 20 allows the extension of the leash, and the outer end 30 of the leash has secured thereto a handhold 32, the specific means represented including a link 34 and the end 30 is connected to this link by a return bend portion which is riveted to the adjacent portion of the leash. The handhold is of strap form and may have approximately the same width as the tape-like leash 24, it being proposed that the handhold will be of leather or plastic and the leash 24 will ordinarily be of metal. It follows that the handhold 32 will have a considerable thickness and a stop 38 is formed at the edge of the opening 20 by inwardly bending a portion of the wall portions 16 and 18. This stop 38 engages what may be considered the inner end of the handhold 36, the position of the stop being critically related to the length of the handhold so that the outer extremity 36 of the handhold will approach but will not enter the casing when the leash is fully retracted.

At the other side of the opening 20, a lip 40 is provided, this lip consisting in arcuately bent portions of the wall portions 16 and 18, this lip being bent outwardly of the casing and the handhold and leash slide on this lip during extension and retraction thereof.

A yoke 42, of U-shape is secured to the casing 10 in any suitable manner. The preferred manner of securement being best indicated in Figures 3 and 4, since this allows a light-weight casing to be used, an axis pin 44 connecting the ends of the yoke with the sides of the casing and extending through the spool 22, and deformations 46 on one or both sides of the casing being provided to prevent rotation of the yoke relative to the casing. Obviously the yoke can be spot welded or otherwise rigidly secured to the casing, or still other means may be used to accomplish this end, the important point to be noted here is the critical relationship of the opening 20, the point of connection of the collar 50, and a point on the tightly wound hub 48 of the leash 24 when the same is fully extended. If the yoke is properly located on the casing to effect this critical co-linear relationship, there is little strain placed on the deformations 46 and a relatively light casing construction can be used, even though the yoke is not otherwise prevented from rotating on the casing. Reference to Figure 3 will fully explain this feature of the instant invention. A link 52 may be used to secure the collar 50 to the yoke 42, and the exact nature of the collar 50 is immaterial in this disclosure. What is important, however, is the provision of means to prevent rotation of the casing, in this instance the collar 50 and the yoke 42 with the deformations 46, so that the casing can be carried by the leashed animal rather than in the hand of the trainer or dog owner.

Minor variation from the embodiment disclosed herein may be resorted to without departure from the spirit and scope of the invention. The present drawing and specification is proposed as illustrative rather than limiting and what I propose as my invention and desire to secure by Letters Patent is:

1. A leash assembly comprising: a casing; a self-retracting extensible leash spirally wound in said casing and having the inner end thereof secured in fixed relation to said casing; said casing having an opening and the outer end of said leash extending through said opening and having a handhold thereon; said leash, aside from said handhold, comprising a spring tape which in its relaxed untensioned condition consists in a relatively loosely coiled form; and means holding said casing against rotation when said leash is extended under tension, said means comprising a collar connected to the casing to prevent rotation of the casing and whereby the casing is adapted for being secured to and carried by the leashed animal in all positions of said leash.

2. A leash assembly comprising: a casing having an axially disposed spool fixed thereto; an extensible self-retracting leash of resilient tape form spirally wound in said casing around said axis element and having its inner end secured to said spool; said casing having an opening and the outer end of said leash extending through said opening and having a handhold thereon; said leash, aside from said handhold, comprising a spring tape which in its relaxed untensioned condition consists in a relatively loosely coiled form; and means holding said casing against rotation when said leash is extended under tension, said means comprising a collar connected to the casing to prevent rotation of the casing and whereby the casing is adapted for being secured to and carried by the leashed animal in all positions of said leash.

3. A leash assembly comprising: a casing; an extensible self-retracting leash of resilient tape form spirally wound in said casing and having the inner end thereof secured in fixed relation to said casing; said casing having an opening and the outer end of said leash extending through said opening and having a handhold thereon; said leash, aside from said handhold, comprising a spring tape which in its relaxed untensioned condition consists in a relatively loosely coiled form; and means holding said casing against rotation when said leash is extended under tension; said means comprising a U-shaped yoke radially straddling the casing and having its ends secured axially of the casing by an axis pin; said yoke being secured in fixed relation to said casing, and a collar secured to said yoke.

4. A leash assembly comprising: a casing; an extensible self-retracting leash of resilient tape form spirally wound in said casing and having the inner end thereof secured in fixed relation to said casing; said casing having an opening and the outer end of said leash extending through said opening and having a handhold thereon; said leash, aside from said handhold, comprising a spring tape which in its relaxed untensioned condition consists in a relatively loosely coiled form; and means holding said casing against rotation when said leash is extended under tension; said means comprising a U-shaped yoke radially straddling the casing and having its ends secured axially of the casing by an axis pin; said yoke being secured in fixed relation to said casing, and a collar secured to said yoke; said casing being generally circular and having a central axis element and said yoke being connected to said axis element; and said casing having deformed portions to hold said casing against rotation relative thereto.

5. A leash assembly comprising: a casing; an extensible self-retracting leash of resilient tape form spirally wound in said casing and having the inner end thereof secured in fixed relation to said casing; said casing having an opening and the outer end of said leash extending through said opening and having a handhold thereon; said leash, aside from said handhold, comprising a spring tape which in its relaxed untensioned condition consists in a relatively loosely coiled form; and means holding said casing against rotation when said leash is extended under tension; said means comprising a yoke secured in fixed relation to said casing, and a collar secured to said yoke; said casing being generally circular and having a central axis element and said yoke being connected to said axis element; and said casing having deformed portions to hold said yoke in fixed radial relation thereto; said leash when fully extended having a tightly wound hub portion in said casing, the point of connection of said collar being colinear with said opening and the point on said hub portion from which said leash extends, whereby the strain on said deformed portions is minimized.

6. A leash assembly comprising: a casing; a self-retracting extensible leash spirally wound in said casing and having the inner end thereof secured in fixed relation to said casing; said casing having an opening and the outer end of said leash extending through said opening and having a handhold thereon; said leash, aside from said handhold, comprising a spring tape which in its relaxed untensioned condition consists in a relatively loosely coiled form; said handhold being a flexible strap and being also retractable into a position wherein it is largely within the casing; and stop means in said casing to arrest the handhold in said position; and means holding said casing against rotation when said leash is extended under tension, said means comprising a collar connected to the casing to prevent rotation of the casing and whereby the casing is adapted for being secured to and carried by the leashed animal in all positions of said leash.

References Cited in the file of this patent

FOREIGN PATENTS 1,063,551  France _____ Dec. 16, 1953